(12) United States Patent
Nishikawa et al.

(10) Patent No.: US 6,735,026 B2
(45) Date of Patent: May 11, 2004

(54) METHOD OF MAGNETICALLY TRANSFERRING INFORMATION SIGNAL FROM MASTER MEDIUM TO SLAVE MEDIUM

(75) Inventors: Masakazu Nishikawa, Kanagawa-ken (JP); Makoto Nagao, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 368 days.

(21) Appl. No.: 09/920,722

(22) Filed: Aug. 3, 2001

(65) Prior Publication Data

US 2002/0034028 A1 Mar. 21, 2002

(30) Foreign Application Priority Data

Aug. 3, 2000 (JP) ........................................ 2000-235486

(51) Int. Cl.[7] ................................................. G11B 5/86
(52) U.S. Cl. ....................................................... 360/17
(58) Field of Search ............................. 360/16, 17, 15, 360/55, 75; G11B 5/84, 5/86

(56) References Cited

U.S. PATENT DOCUMENTS 5,479,300 A * 12/1995 Nelson et al. ................ 360/16
6,347,016 B1 * 2/2002 Ishida et al. .................. 360/17

FOREIGN PATENT DOCUMENTS

| EP | 0 915 456 A1 | 5/1999 | ............ G11B/5/86 |
| JP | 63-183623 | 7/1988 | ............ G11B/5/86 |
| JP | 10-40544 | 2/1998 | ............ G11B/5/86 |
| JP | 10-269566 | 10/1998 | ............ G11B/5/84 |

* cited by examiner

Primary Examiner—David Hudspeth
Assistant Examiner—Dan I. Davidson
(74) Attorney, Agent, or Firm—Sughrue Mion, PLLC

(57) ABSTRACT

Disclosed is a magnetic transfer method magnetically transferring information signals such as servo signals from a master medium to a slave medium, which is capable of preventing the occurrence of missing signals due to insufficient contact of the master medium and the slave medium originating from adhering of dust to the slave medium, thus increasing reliability. When the master medium bearing information signals and the slave medium are brought into close contacted with each other, and when a transfer magnetic field is applied to the master medium and the slave medium to magnetically transfer the information signal from the master medium to the slave medium, a metal thin film formed on a substrate of the master medium is electrically grounded, and charges of the master medium are removed, thus reducing a quantity of adhering dust.

12 Claims, 2 Drawing Sheets

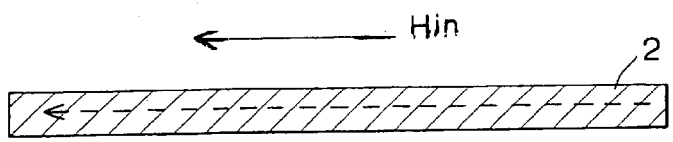
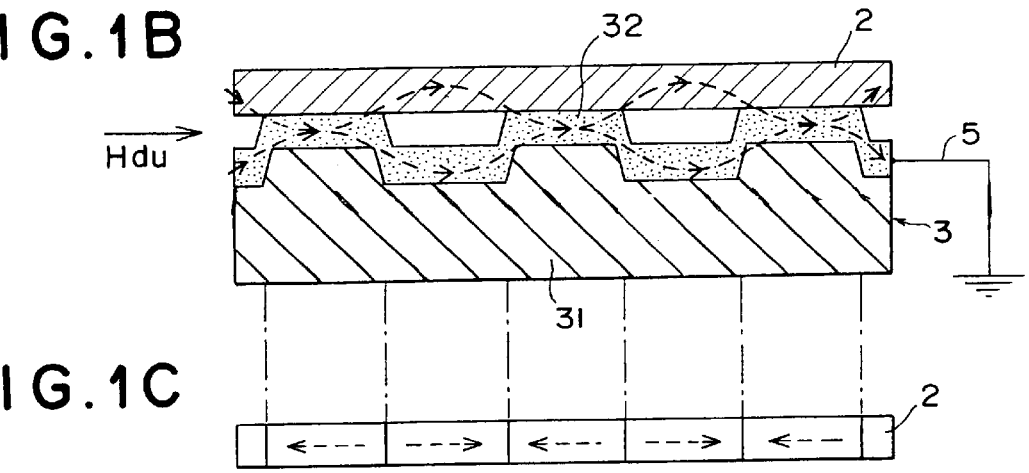
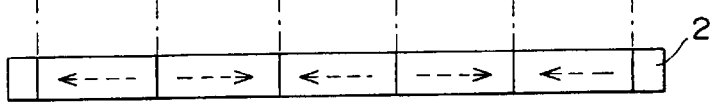
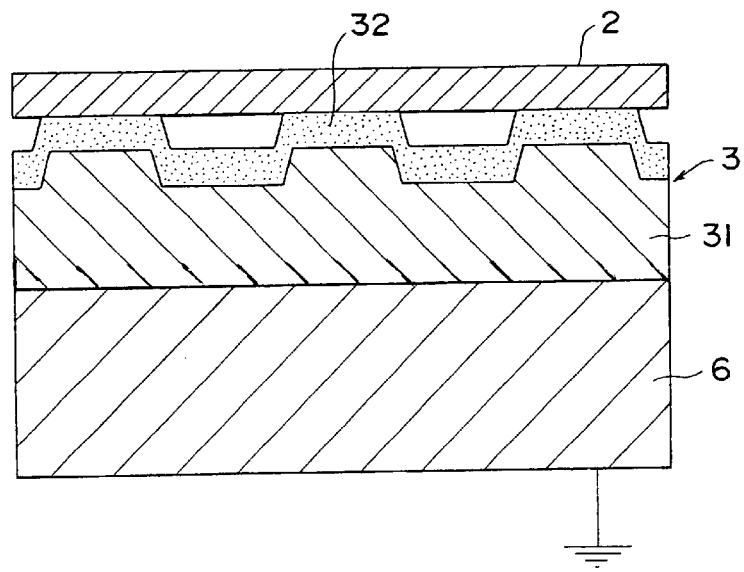

METHOD OF MAGNETICALLY TRANSFERRING INFORMATION SIGNAL FROM MASTER MEDIUM TO SLAVE MEDIUM

BACKGROUND OF THE INVENTION

1. Field of the Invention

The present invention relates to a method of magnetically transferring magnetic information recorded in a master medium to a slave medium.

2. Description of the Prior Art

The magnetic transfer method is one for magnetically transferring magnetic patterns corresponding to magnetic information (for example, servo signals) recorded in a master medium to a slave medium by applying magnetic field for transferring in a state where the master medium and the slave medium are in close contact with each other. This magnetic transfer method is disclosed, for example, in Japanese Unexamined Patent Publication No. 63(1988)-183623, 10(1998)-40544, 10(1998)-269566 and the like.

SUMMARY OF THE INVENTION

However, if foreign matter such as dust exists between the master medium and the slave medium in magnetically transferring the magnetic pattern from the master medium to the slave medium, a space is created between the master medium and the slave medium, and hence areas where no magnetic transfer is performed occur. If the areas where no magnetic transfer is performed occur, the magnetic information is not transferred in these areas, and missing signals in the magnetic information transferred to the slave medium occur. When the recorded signals are servo signals, a satisfactory tracking function cannot be sufficiently obtained, and reliability of reproducing the information signals is lowered.

The foreign matter such as dust mainly adheres to the slave medium. Most of the substances adhering to the slave medium are dust and fiber waste mixed in manufacturing steps of the slave medium.

As described above, the magnetic transferring method is performed in such a manner that the master medium and the slave medium are made to be in close contact with each other, and information signals recorded in the master medium are magnetically transferred to the slave medium by applying a magnetic field to them. In the magnetic transferring step, the substances adhering on the surface of the slave medium move to the master medium, and the quantity of substances adhering to the master medium increases as the number of times of transferring increases, resulting in the occurrence of missing signals.

Furthermore, some of the master mediums have a substrate made of an insulator, and a magnetic layer made of a metal thin film is formed in magnetic patterns corresponding to servo signals in the information bearing plane of the maser medium. The metal thin film electrically floats, or the master medium itself electrically floats. If the metal thin film or the master medium electrically floats, the master medium is made to be a charged state, and dust and the like is apt to adhere to the surface of the master medium. Adhesive power of the adhering substances increases, thus increasing a quantity of movement of the dust from the slave medium to the master medium.

The present invention was made from in view of the above described problems. The object of the present invention is to provide a method of magnetically transferring information signals from a master medium to a slave medium, which is capable of preventing the occurrence of missing signals in magnetically transferring the information signals by reducing a quantity of dust moving and adhering to the master medium, thus achieving a magnetic transfer of the information signals with a high reliability.

The method of the present invention, which allows a master medium and a slave medium to be in close contact with each other, and magnetically transfers information signals recorded in the master medium to the slave medium by applying a magnetic field for transferring to them, comprises the step of electrically grounding a metal thin film formed on a substrate of the master medium.

The metal thin film is directly grounded, or the metal thin film is grounded through the substrate when the substrate is an electrical conductor.

As the foregoing magnetic transfer method, the slave medium is first subjected to DC magnetization in a tracking direction, and the slave medium is allowed to be in close contact with the master medium for use in a magnetic transfer, in which a magnetic layer is formed in micro uneven patterns corresponding to information signals, which are to be transferred. Transfer magnetic field should be applied to the master medium and the slave medium in a direction approximately reverse to an initial DC magnetization direction for the slave medium. A servo signal is preferred as the foregoing information signal.

According to the present invention, the metal thin film formed on the substrate of the master medium is electrically grounded. Accordingly, electric charges of the master medium are discharged, and it is possible to control the dust and the like adhering to the slave medium from moving to the master medium accompanying the close contact of the master medium with the slave medium in magnetically transferring the information signal from the master medium to the slave medium. A quantity of dust adhering to the master medium is reduced even when the magnetic transfer is performed many times. It is possible to prevent the occurrence of missing signals due to insufficient contact of the master medium with the slave medium resulting from the existence of dust adhering to the master medium. The magnetic transfer can be performed with stabile quality, and an enhancement of reliability can be achieved.

BRIEF DESCRIPTION OF THE DRAWINGS

FIGS. 1A, 1B and 1C are sectional views showing a magnetic transfer method according to a first embodiment of the present invention.

FIG. 2 is a sectional view showing a magnetic transfer method according to another embodiment of the present invention.

DETAILED DESCRIPTION OF THE PREFERRED EMBODIMENTS

Figure 3:
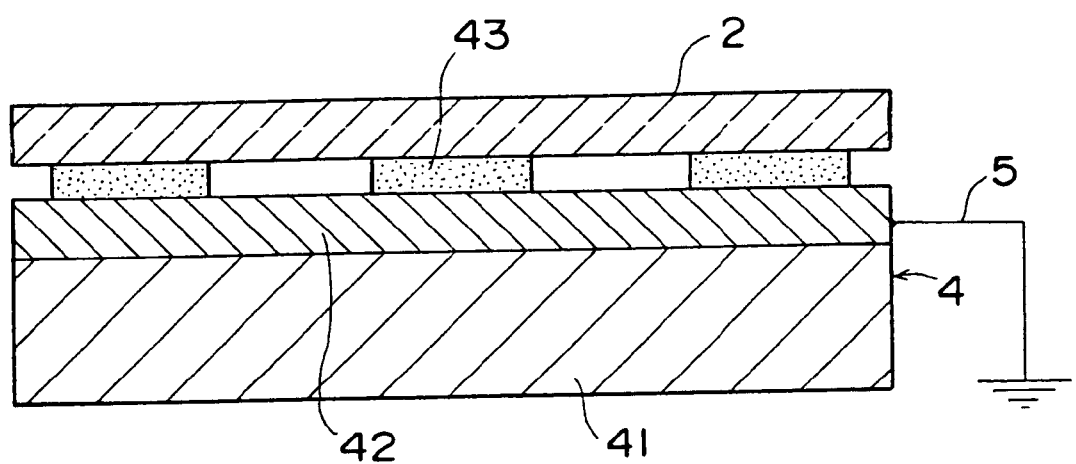
FIG. 3 is a sectional view showing a magnetic transfer method according to yet another embodiment of the present invention.

Embodiments of the present invention will be described in detail with reference to the accompanying drawings.

FIGS. 1A, 1B and 1C are sectional views showing a principal mode of the magnetic transfer method of the present invention. FIG. 1A shows a step for allowing a slave medium to undergo an initial DC magnetization by applying magnetic field in one direction. FIG. 1B shows a step for bringing the master medium and the slave medium into close contact with each other and applying the magnetic field to them in a direction opposite to that of FIG. 1A. FIG. 1C shows a state of the slave medium after the magnetic transfer.

A summary of the magnetic transfer method is as follows. First, as shown in FIG. 1A, an initial magnetic field Hin is applied to the slave medium 2 in a direction equal to a tracking direction, and the slave medium is previously subjected to DC magnetization (DC demagnetization). Thereafter, as shown in FIG. 1B, a magnetic transfer surface of the slave medium 2 is made to be in close contact with an information bearing plane in which micro uneven patterns of a substrate 31 of the master medium 3 are covered with a magnetic layer 32 made of a metal thin film. Transfer magnetic field Hdu is applied to the master medium 3 and the slave medium 2 along a tracking direction of the slave medium 2 in a direction reverse to the initial magnetic field Hin. Thus, the magnetic transfer is performed. As a result, as shown in FIG. 1C, information of the master medium 3 is magnetically transferred to a magnetic transfer surface (track) of the slave medium 2. The information corresponds to the pattern formed by recesses and protrusions closely contacting the slave medium 2, in the magnetic layer 32 of the information bearing plane. As to details of such a magnetic transfer method, refer to contents written in Japanese Unexamined Patent Publication No. 11(1999)-117800.

Note that even when the uneven patterns formed in the substrate 31 of the master medium 3 are a negative pattern having uneven patterns opposite to those of the positive pattern of FIG. 1, the same information as that in the above can be magnetically transferred by making a direction of the initial magnetic field Hin and a direction of the transfer magnetic field Hdu reverse to those in the above.

When the substrate 31 is a ferromagnet material such as Ni and the like, the magnetic transfer can be performed by the substrate 31 only, and it is unnecessary to cover the substrate 31 with the foregoing magnetic layer 32 (soft magnetic layer). A good magnetic transfer can be achieved by providing a magnetic layer 32 having excellent transfer properties. When the substrate 31 is made of a nonmagnetic substance, it is necessary to provide the magnetic layer 32 on the substrate 31.

When the substrate 31 made of a ferromagnetic metal is covered with the magnetic layer 32, a nonmagnetic layer should be provided between the substrate 31 and the magnetic layer 32 in order to shield against the influence of the magnetism of the substrate 31. Furthermore, when a protection film such as diamond-like carbon (DLC) is provided on the uppermost layer, this protection film enhances a resistance to contact, and the magnetic transfer can be performed many times. An Si film may be formed under the DLC protection film by sputtering and the like.

Furthermore, when the magnetic transfer is performed for both sides of the slave medium 2, there are the following two methods. One is that the magnetic transfer is performed for one surface of the slave medium 2 and then for the other surface thereof in different steps. The other is that the master medium 3 is allowed to be brought into close contact with each side of the slave medium 2, and the magnetic transfer is simultaneously performed for both sides of the slave medium 2.

The magnetic layer 32 that is the metal thin film of the master medium 3 is electrically connected to an apparatus body (not shown) and the like by wiring 5, and grounded.

FIG. 2 shows another embodiment. The master medium 3 identical to that of FIG. 1B is formed by a stamper method. In this case, the substrate 31 is made of a metal such as Ni and the like, and the substrate 31 and the magnetic layer 32 are electrically communicated with each other. A supporting member 6 holding the master medium 3 is formed of an electrically conductive material such as conductive rubber, and the supporting member 6 is electrically connected to an apparatus body. By bringing the supporting member 6 and the substrate 31 into contact with each other, the magnetic layer 32 is grounded indirectly.

FIG. 3 shows still another embodiment. A master medium 4 is formed by a photo-lithography method, and a substrate 41 is constituted of an insulating material such as a silicon wafer. The magnetic layer 43 is partially formed on the information bearing plane of the substrate 41 in accordance with the magnetic pattern. At this time, a metal thin film 42 is coated on the substrate 41, and the pattern of the magnetic layer 43 is formed. The magnetic thin layer 42 is electrically connected to an apparatus body (not shown) and the like by the wiring 5, and grounded.

Next, the preparation of the master mediums 3 and 4 for the magnetic transfer will be described. As the substrates 31 and 41 of the master mediums 3 and 4, nickel, silicon, a quartz plate, glass, aluminum, an alloy, ceramics, synthetic resin and the like are used. The formation of the uneven pattern is performed by a stamper method, a photo-lithography method and the like.

The stamper method is performed in the following manner. Photoresist is formed on a glass plate or a quartz plate having a flat surface by a spin coat method or the like. The glass plate is rotated, and, at the same time, a laser beam or an electron beam, which is modulated in accordance with a servo signal, is radiated onto the photoresist. Predetermined patterns are formed by exposure on the entire surface of the photoresist. For example, the pattern extending linearly from the center of rotation in the radial direction in each track and corresponding to a servo signal is formed by exposure in the portion corresponding to each frame on the circumference of the glass plate. Thereafter, the photoresist is subjected to developing processing, and the exposed portions are removed. Thus, an original disc having uneven patterns with the photoresist is obtained. Subsequently, plating is performed for the surface of the original disc in accordance with the uneven patterns formed on the surface of the original disc, and a Ni substrate having positive uneven patterns is prepared. Then, the Ni substrate is peeled off from the original disc. This substrate is used as the master medium as it is, or used as the master medium after a nonmagnetic layer, a soft magnetic layer or a protection film is coated on the uneven patterns if necessary.

Alternatively, a substrate having negative uneven patterns may be prepared in such a manner that a second original disc is prepared by performing plating for the foregoing original disc, and plating is performed by use of the second original disc. Furthermore, a substrate having positive uneven patterns may be prepared in such a manner that a third original disc is prepared by performing plating for the second original disc or by pressing resin liquid against the second original disc to harden the second original disc, and plating is performed for the third original disc.

On the other hand, photoresist patterns are formed on the foregoing glass plate, and then holes are formed in the glass plate by etching. The photoresist is removed, and thus an original disc is obtained. Subsequently, the same preparation steps as the above may be performed, and thus a substrate may be obtained.

As a material of the substrate made of a metal, Ni or a Ni alloy can be used. Various metal film growth methods including electroless plating, electroforming, sputtering and ion plating can be applied for the plating for preparing the substrate. A depth of the uneven patterns in the substrate, that is, a height of the protrusions, should preferably be within a range of 80 to 800 nm, more preferably within a range of 150 to 600 nm. When the information signal of the master medium is a servo signal, the uneven patterns are formed so as to be longitudinal in the radius direction. For example, the uneven pattern should have a length of 0.3 to 20 μm in the radius direction of the substrate and 0.2 to 5 μm in the circumference direction thereof. For a pattern bearing information signal that is a servo signal, it is preferable to select a pattern longer in the radius direction than in the circumference direction within these ranges.

The formation of the foregoing magnetic layer (soft magnetic layer) is performed in such a manner that a magnetic material is grown by a plating method, and by a vacuum film growth method including a vacuum evaporation method, a sputtering method, an ion plating method and the like. As a magnetic material for the magnetic layer, Co, a Co alloy (CoNi, CoNiZr, CoNbTaZr and the like), Fe, an Fe alloy (FeCo, FeCoNi, FeNiMo, FeAlSi, FeAl and FeTaN), Ni and an Ni alloy (NiFe) can be used. FeCo and FeCoNi are particularly preferable as the material for the magnetic layer. A thickness of the magnetic layer is preferable within a range of 50 to 500 nm, and more preferable within a range of 150 to 400 nm. As a material of the nonmagnetic layer provided as a base layer under the magnetic layer, Cr, CrTi, CoCr, CrTa, CrMo, NiAl, Ru, C, Ti, Al, Mo, W, Ta, Nb and the like are used. The nonmagnetic layer can suppress deterioration in quality of the signals when the substrate is a ferromagnetic substance.

A protection film such as the DLC should be provided on the magnetic layer, and a lubricant layer may be provided on the magnetic layer. It is more preferable that the DLC film and the lubricant layer which have a thickness of 5 to 30 nm in total are present as the protection film on the magnetic layer. A close-contact-strengthening layer such as Si may be provided between the magnetic layer and the protection film. Lubricant reduces deterioration in durability owing to occurrence of flaws caused by rubbing when slippage of the master medium from the slave medium caused in the contacting step is corrected.

A resin substrate may be prepared by use of the original disc, and a magnetic layer may be provided on a surface of the resin substrate. Thus, the resultant structure may be used as a master medium. As a resin material of the resin substrate, acrylic resin such as polycarbonate and polymethyl methacrylate, vinyl chloride resin such as polyvinyl chloride and polyvinyl chloride copolymer, epoxy resin, amorphous polyolefin, polyester and the like can be used. Polycarbonate is preferable in terms of humidity resistance, dimensional stability and cost. In the case where a molded component has burrs, the burrs are removed by burnishing or polishing. The height of the pattern protrusions in the resin substrate is preferably within a range of 50 to 1000 nm, and more preferably within a range of 200 to 500 nm.

The master medium is obtained by coating a magnetic layer on the micro patterns of the surface of the resin substrate. The formation of the magnetic layer is performed in such a manner that a magnetic material is grown by a vacuum film growth method including an evaporation method, a sputtering method, an ion-plating method and the like and by a plating method.

On the other hand, the photo-lithography method is performed in such a manner that photoresist is coated on a smooth surface of a plane-shaped substrate, and patterns in accordance with information signals are formed by exposure and developing processing using a photo mask in accordance with the patterns of servo signals. Subsequently, in an etching step, etching of the substrate is performed in accordance with the patterns, and holes having a depth equivalent to a thickness of the magnetic layer are formed. Thereafter, a magnetic material is grown up to the surface of the substrate with a thickness equivalent to the depth of the holes by a vacuum film growth method including an evaporation method, a sputtering method, an ion-plating method and the like, and by a plating method. Next, the photoresist is removed by a lift-off method, and the surface of the substrate is polished. Thus, burrs are removed if they exist, and the surface of the substrate is smoothed.

Next, description of the slave medium 2 will be given. As the slave medium 2, a coating type magnetic recording medium or a metal thin film magnetic recording medium is used. As the coating type magnetic recording medium, a medium currently available on the market such as a high density flexible disc is mentioned. As to the metal thin film magnetic recording medium, Co, a Co alloy (CoPtCr, CoCr, CoPtCrTa, CoPtCrNbTa, CoCrB, CoNi and the like), Fe, an Fe alloy (FeCo, FePt and FeConi) can be used as a magnetic material. Since these materials have high magnetic flux densities and magnetic anisotropy in a direction identical to a direction of the magnetic field application (the direction of the magnetic field application is parallel to the surfaces of the master medium and the slave medium in the case of an intra-layer recording, and the direction of the magnetic field application is perpendicular to the surfaces of the master medium and the slave medium in the case of a vertical recording), these materials are preferable because they enable a clear transfer to be performed. To allow a portion (supporting body side) under the magnetic material to have necessary magnetic anisotropy, a nonmagnetic base layer should be provided. This nonmagnetic base layer needs to be coincident with the magnetic layer in crystal structure and lattice constant. To allow the nonmagnetic base layer to have the same crystal structure and the same lattice constant as those of the magnetic layer, Cr, CrTi, CoCr, CrTa, CrMo, NiAl, Ru or the like are used.

Embodiments 1 and 2 and comparative examples 1 and 2 of the magnetic transfer method of the present invention are shown, and evaluation results of the properties thereof are shown in Table 1.

[Embodiment 1]

In the magnetic transfer method of the embodiment 1, a high density flexible disc (Zip 250) currently available on the market was used, and an initial magnetization was performed. The master medium was prepared by a photo-lithography method. A 3.5 type Si wafer disc having a diameter of 3.5 inch was used as the substrate. A Cr metal thin film having a thickness of 600 nm was coated on the substrate, and then photoresist was coated. Transfer patterns were formed by exposure and developing processing. Thereafter, FeCo 30 at % containing Co of 30 atom % for Fe and having a thickness of 200 nm was formed, the photoresist was removed by a lift-off technique, and a patterned soft magnetic layer was prepared. The patterns of the soft magnetic layer have the following shape. The patterns extend radially within a range of 20 to 40 mm from the center of the disc at equal intervals, and each of the pattern has a width of 5 μm spreads. The interval of each pattern at the innermost position, which is 20 mm distant radially from the center of the disc, is 1.5 μm. Note that the Cr metal thin film and the magnetic layer were prepared by a DC sputtering method. With respect to Ar sputtering pressure, Cr:$1.1\times10^{-2}$Pa(8 mTorr) and FeCo $5.0\times10^{-4}$Pa (0.36 mTorr), and applied power was 2.80 W/cm$^2$ for both of the Cr metal thin film and the magnetic layer.

The master medium was brought into close contact with the slave medium. A transfer magnetic field was applied to them in a direction reverse to the initial magnetic field, and information signals were magnetically transferred from the master medium to the slave medium. At this time, the Cr metal thin film in the master medium was connected to the apparatus body, and electrically grounded (see FIG. 3).

[Embodiment 2]

In a magnetic transfer method of the embodiment 2, the magnetic transfer for a slave medium identical to that of the embodiment 1 was performed by use of a master medium prepared by a stamper method.

In the master medium, a soft magnetic layer containing FeCo 50 at % was provided at a temperature of 25° C. on an Ni substrate having uneven patterns formed by the stamper method as described above. The formed patterns were the same as those in the embodiment 1. Ar sputtering pressure was $1.5\times10^{-4}$Pa (1.08 mTorr), and applied power was 2.80 W/cm$^2$.

In performing the magnetic transfer, the master medium was disposed on a supporting member made of conductive rubber, and a soft magnetic layer (a metal thin film) was electrically grounded through the substrate (see FIG. 2).

Comparison Example 1

In a magnetic transfer method of the comparison example 1, the magnetic transfer was performed by use of a slave medium and a master medium, which are identical to those of the embodiment 1. A Cr metal thin film was not grounded in performing the magnetic transfer.

Comparison Example 2

In a magnetic transfer method of the comparison example 2, the magnetic transfer was performed by use of a slave medium and a master medium, which are identical to those of the embodiment 2, and a Ni substrate was not grounded in performing the magnetic transfer.

In Table 1, as an evaluation method for "a missing signal", magnetic developing solution (manufactured by Sigma Hi-Chemical Inc.; Sigmarker Q) was diluted ten times. The solution was dropped on the slave medium that had been subjected to the magnetic transfer, and dried. Variations of the edges of the magnetically transferred signal which was developed were evaluated. The servo signal is observed by a hundred fields of view under a differential interference microscope at magnification of 50. If the observation result shows a good value where the missing signals were observed in five spots or less, the evaluation result is shown by the symbol "o". If the observation result shows a bad value where the missing signals were observed in more than five spots, the evaluation result is shown by the symbol "x".

As is understood from the results of Table 1, since the metal thin film on the information bearing plane of the master medium is electrically grounded in performing the magnetic transfer in the embodiments 1 and 2, the charges of the master medium are removed, and a quantity of dust adhering to the master medium decreases, the number of missing signals is small and good results can be obtained. On the contrary, in the comparative examples 1 and 2, the master medium is not grounded in performing the magnetic transfer, so that the number of missing signals is large and a quality of the magnetic transfer is degraded.

TABLE 1

| Sample | Grounded/Ungrounded | Number of Missing Signals |
| --- | --- | --- |
| Embodiment 1 | Grounded | 4 (o) |
| Embodiment 2 | Grounded | 3 (o) |
| Comparative Example 1 | Ungrounded | 16 (x) |
| Comparative Example 2 | Ungrounded | 19 (x) |

What is claimed is:

1. A magnetic transfer method comprising the steps of:

preparing a master medium bearing information signals;

preparing a slave medium;

allowing said master medium and said slave medium to be brought into close contact with each other; and applying a magnetic field to said master medium and said slave medium, thus magnetically transferring the information signals of said master medium to said slave medium while electrically grounding a metal thin film formed on a substrate of said master medium.

2. The magnetic transfer method according to claim 1, wherein said metal thin film is directly grounded.

3. The magnetic transfer method according to claim 1, wherein said substrate is made of an electrically conductive substance.

4. The magnetic transfer method according to claim 2, wherein said metal thin film is grounded through said substrate of said master medium.

5. The magnetic transfer method according to claim 1, wherein said metal thin film is a magnetic layer.

6. A magnetic transfer method comprising the steps of:

preparing a master medium bearing information signals to be transferred to a slave medium;

preparing said slave medium;

allowing said slave medium to be subjected to DC magnetization in a tracking direction thereof;

allowing said slave medium to be brought into close contact with said master medium having a magnetic layer formed in each of micro uneven patterns corresponding to said information signals; and applying a transfer magnetic field to said master medium and said slave medium in a direction reverse to that of the DC magnetization for said slave medium while electrically grounding a metal thin film formed on a substrate of said master medium.

7. The magnetic transfer method according to claim 6, wherein said metal thin film is directly grounded.

8. The magnetic transfer method according to claim 6, wherein said substrate is made of an electrically conductive substance.

9. The magnetic transfer method according to claim 8, wherein said metal thin film is grounded through said substrate of said master medium.

10. The magnetic transfer method according to claim 6, wherein said metal thin film is a magnetic layer.

11. A magnetic transfer method comprising the steps of:

preparing a master medium bearing information signals;

preparing a slave medium;

allowing said master medium and said slave medium to be brought into close contact with each other; and applying a magnetic field to said master medium and said slave medium, thus magnetically transferring the information signals of said master medium to said slave medium while electrically grounding a substrate of said master medium, said substrate being made of a ferromagnetic substance.

12. A magnetic transfer method comprising the steps of:

preparing a master medium bearing information signals to be transferred to a slave medium;

preparing said slave medium;

allowing said slave medium to be subjected to DC magnetization in a tracking direction thereof;

allowing said slave medium to be brought into close contact with said master medium having a magnetic layer formed in each of micro uneven patterns corresponding to said information signals; and applying a magnetic field to said master medium and said slave medium in a direction reverse to that of the DC magnetization for said slave medium while electrically grounding a substrate of said master medium, said substrate being made of a ferromagnetic substance.

* * * * *